(12) United States Patent
Lu et al.

(10) Patent No.: US 10,764,903 B2
(45) Date of Patent: Sep. 1, 2020

(54) PER-PACKET RESOURCE POOL SELECTION IN LTE V2X SYSTEM

(71) Applicant: TELEFONAKTIEBOLAGET LM ERICSSON (PUBL), Stockholm (SE)

(72) Inventors: Qianxi Lu, Beijing (CN); Marco Belleschi, Solna (SE); Johnny Karout, Göteborg (SE); Stefano Sorrentino, Solna (SE); Pontus Wallentin, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/762,681

(22) PCT Filed: Sep. 21, 2016

(86) PCT No.: PCT/IB2016/055636
§ 371 (c)(1),
(2) Date: Mar. 23, 2018

(87) PCT Pub. No.: WO2017/051330
PCT Pub. Date: Mar. 30, 2017

(65) Prior Publication Data
US 2018/0295628 A1    Oct. 11, 2018

(30) Foreign Application Priority Data

Sep. 25, 2015  (WO) ............... PCT/CN2015/090835

(51) Int. Cl.
*H04W 72/08*    (2009.01)
*H04L 5/00*     (2006.01)
(Continued)

(52) U.S. Cl.
CPC .......... *H04W 72/08* (2013.01); *H04L 5/0044* (2013.01); *H04L 5/0058* (2013.01); *H04W 4/40* (2018.02);
(Continued)

(58) Field of Classification Search
None
See application file for complete search history.

(56) References Cited

U.S. PATENT DOCUMENTS

2007/0106744 A1*  5/2007  Bicheno ............... H04L 63/104
                                                           709/213
2008/0175237 A1*  7/2008  Kim .................... H04L 12/1886
                                                           370/389
(Continued)

FOREIGN PATENT DOCUMENTS

WO    2013009635 A2    1/2013
WO    2015103733 A1    7/2015
(Continued)

OTHER PUBLICATIONS

Qualcomm Incorporated, Running stage 2 CR TS 36.300 to capture agreement on eD2D, 3GPP TSG-RAN WG2 #91, R2-153734, Beijing, China, Aug. 24-28, 0215.
(Continued)

*Primary Examiner* — Michael J Moore, Jr.

(57) ABSTRACT

A method in a node is disclosed. The method comprises generating a tag for an associated data packet at a first layer, the generated tag indicating one or more parameters related to transmission of the associated data packet. The method comprises signaling the tag from the first layer to another layer. The method comprises mapping, at the another layer, the associated data packet to a logical channel based on the one or more parameters indicated by the tag, and selecting one or more resources for transmission of the associated data
(Continued)

packet based on the mapping of the associated data packet to the logical channel.

34 Claims, 8 Drawing Sheets

(51) Int. Cl.
*H04W 72/12* (2009.01)
*H04W 4/40* (2018.01)
*H04W 80/02* (2009.01)
*H04W 80/12* (2009.01)
*H04W 84/04* (2009.01)

(52) U.S. Cl.
CPC ........ *H04W 72/1205* (2013.01); *H04W 80/02* (2013.01); *H04W 80/12* (2013.01); *H04W 84/04* (2013.01)

(56) References Cited

U.S. PATENT DOCUMENTS

| | | | | |
|---|---|---|---|---|
| 2010/0106847 | A1* | 4/2010 | White | H04N 7/24 709/231 |
| 2011/0249970 | A1* | 10/2011 | Eddleston | H04L 12/18 398/58 |
| 2014/0307600 | A1* | 10/2014 | Dumitrescu | H04W 52/0245 370/311 |
| 2016/0225260 | A1* | 8/2016 | Lin | B60R 25/24 |
| 2016/0338078 | A1* | 11/2016 | Wang | H04W 72/085 |
| 2016/0381491 | A1* | 12/2016 | Watfa | H04W 76/14 455/41.2 |
| 2017/0048888 | A1* | 2/2017 | Belleschi | H04W 8/005 |
| 2017/0245292 | A1* | 8/2017 | Agiwal | H04W 28/02 |
| 2017/0257876 | A1* | 9/2017 | Loehr | H04W 28/0278 |
| 2018/0063852 | A1* | 3/2018 | Kang | H04W 72/10 |
| 2018/0110054 | A1* | 4/2018 | Jung | H04W 72/02 |
| 2018/0159935 | A1* | 6/2018 | Cavalcanti | H04W 4/44 |
| 2018/0192457 | A1* | 7/2018 | Yi | H04L 1/00 |
| 2018/0199194 | A1* | 7/2018 | Xu | H04W 4/046 |
| 2018/0206260 | A1* | 7/2018 | Khoryaev | H04W 72/1242 |
| 2018/0227882 | A1* | 8/2018 | Freda | H04W 8/005 |
| 2018/0255499 | A1* | 9/2018 | Loehr | H04B 7/2606 |
| 2018/0279162 | A1* | 9/2018 | Yi | H04W 76/27 |
| 2019/0394803 | A1* | 12/2019 | Blasco Serrano | H04W 4/40 |

FOREIGN PATENT DOCUMENTS

| | | |
|---|---|---|
| WO | 2015119483 A1 | 8/2015 |
| WO | 2015142082 A1 | 9/2015 |

OTHER PUBLICATIONS

Final draft ETSI EN 302 637-2 V1.3.1, Intelligent Transport Systems (ITS); Vehicular Communications; Basic Set of Applications; Part 2: Specification of Cooperative Awareness Basic Service, Sep. 2014.
3GPP TR 22.885 V1.0.0, 3rd Generation Partnership Project; Technical Specification Group Services and System Aspects; Study on LTE Support for V2X Services (Release 14), Sep. 2015.
3GPP TS 23.303 V13.0.0, 3rd Generation Partnership Project; Technical Specification Group Services and System Aspects; Proximity-based services (ProSe); Stage 2 (Release 13); Jun. 2015.
3GPP TS 36.321 V12.6.0, 3rd Generation Partnership Project; Technical Specification Group Radio Access Network; Evolved Universal Terrestrial Radio Access (E-UTRA); Medium Access Control (MAC) protocol specification (Release 12), Jun. 2015.
ETSI TS 102 687 V1.1.1, Intelligent Transport Systems (ITS); Decentralized Congestion Control Mechanisms for Intelligent Transport Systems operating in the 5 GHz range; Access layer part, Jul. 2011.

* cited by examiner

PER-PACKET RESOURCE POOL SELECTION IN LTE V2X SYSTEM

PRIORITY

This application is a 371 of International Application No. PCT/162016/055636, filed Sep. 21, 2016, which claims the benefit of International Application No. PCT/CN2015/090835, filed Sep. 25, 2015, the disclosures of which are fully incorporated herein by reference.

TECHNICAL FIELD

The present disclosure relates, in general, to wireless communications and, more particularly, per-packet resource pool selection in LTE V2X systems.

BACKGROUND

During Release 12, the 3rd Generation Partnership Project (3GPP) Long Term Evolution (LTE) standard has been extended with support of device-to-device (D2D) (specified as "sidelink" or Proximity Services (ProSe)) features targeting both commercial and Public Safety applications. An example application enabled by Release 12 LTE is device discovery, where devices are able to sense the proximity of another device and associated application by broadcasting and detecting discovery messages that carry device and application identities. Another example application is direct communication based on physical channels terminated directly between devices.

One of the potential extensions for the D2D is support of vehicle-to-anything-you-can-imagine (V2X) communication, which includes any combination of direct communication between vehicles, pedestrians and infrastructure. V2X communication may take advantage of a network infrastructure, when available, but at least basic V2X connectivity should be possible even in case of lack of coverage. Providing an LTE-based V2X interface may be economically advantageous because of the LTE economies of scale, and it may enable tighter integration between communications with the network infrastructure (V2I/V2N), vehicle-to-pedestrian (V2P) communications, and vehicle-to-vehicle (V2V) communications, as compared to using a dedicated V2X technology.

V2X communications may carry both non-safety and safety information, where each of the applications and services may be associated with specific requirements sets (e.g., in terms of latency, reliability, capacity, etc.).

Further LTE-based V2X studies may be desirable due to rapid changes in technology and the market for V2X communication. There are many research projects and field tests of connected vehicles taking place around the world. In China, for example, the China Communications Standards Association (CCSA) finished the feasible study for vehicle safety applications based on time-division (TD)-LTE in 2014, and began a series of industrial standards of communication based on LTE for vehicle applications. In March 2015, the CCSA also started a study on radio spectrum for V2X and some vehicular industrial alliances in China. Based on the study, the National Regulatory Authority in China will allocate the spectrum for connected vehicles.

3GPP SA1#69 recently agreed to new Release 14 studies on LTE support for V2X services: (1) S1-150284, "Proposed study on LTE-based V2X," LG Electronics Inc., 3GPP TSG-SA WG1 Meeting #69, February 2015; and (2) SP-150051, "New WID for Study on LTE support for V2X services (FS_V2XLTE), from S1-150284," 3GPP TSG SA Meeting #67, March 2015. The purpose of these studies is to investigate the essential use cases and requirements for V2V, V2P, and V2I/N. V2V covers LTE-based communication between vehicles. V2P covers LTE-based communication between a vehicle and a device carried by an individual (e.g., a handheld terminal carried by a pedestrian, cyclist, driver or passenger). V2I/N (vehicle-to-infrastructure/network), meanwhile, covers LTE-based communication between a vehicle and, for example, a network node such as a roadside unit (RSU). An RSU is a transportation infrastructure entity (e.g., an entity transmitting speed notifications) implemented in an eNodeB (eNB) or a stationary user equipment (UE).

The SA1 study considers both safety services and non-safety services, as well as the possibility of using existing LTE technologies for unicast, multicast, and/or broadcast communication.

More recently, a Release 13 RAN SI has been approved. Its objectives are to evaluate new functionalities needed to operate LTE-based V2X (e.g., V2V, V2I/N, and V2P), and to investigate potential enhancements for vehicular services as defined in 3GPP TR 22.885, v0.2.0, "Study on LTE Support for V2X Services."

Typical V2X traffic varies greatly in terms of traffic properties, which depend on the specific service being used. For example, packet size and packet periodicity can be very different depending on the service considered. Furthermore, different services are characterized by widely varying radio requirements in terms of, for example, reliability, range and latency. The radio-level behavior should preferably take into account the Quality of Service (QoS) requirements and properties of the traffic in order to optimize performance. The application generating the traffic, however, is generally transparent to the radio layers.

The above problems are known in 3GPP. Existing approaches have attempted to address these problems by defining different types of bearers associated to different applications and types of traffic (e.g., VoIP, best effort, etc.). The V2X traffic, however, is very heterogeneous in terms of requirements and characteristics. Thus, it would result in an impractical number of different bearers if all requirements had to be explicitly supported.

In addition, typical radio systems (e.g., LTE) define different types of nodes with different radio interfaces. For example, the eNB radio interface is different from the interface in a UE. There are also significant differences in the architecture and protocols implemented at different nodes. Mapping between type of nodes and interfaces is no longer respected (e.g., for V2X). For example, a RSU is a network node that can be implemented in various ways. The radio layers may, for example, use either the same interface as an eNB or as a UE, depending on deployment choices. In the case of a UE-type interface, for example, the behavior of the radio layers may be different from the behavior expected from a UE used as a car. Similarly, UEs may even be mounted on cars, or used as handheld devices performing V2X services. Even in these cases, the specified radio interface is supposed to act differently depending on the type of node implementing it.

The Intelligent Transport Systems (ITS) application layer is standardized in ETSITS 302 637-2, "Intelligent Transport Systems (ITS); Vehicular Communications; Basic Set of Applications; Part 2: Specification of Cooperative Awareness Basic Service," November 2014. As standardized, the application layer would generate packets of various types in different dimensions: 1) the variation of traffic type: as stated in section 2.1, V2V, V2I (and I2V) and V2P (and P2V) traffic may be generated by the same ITS application layer; and 2) the variation of traffic periodicity: for the ITS application layer, two of the key/typical application messages are the Co-operative Awareness Message (CAM) and Decentralized Environmental Notification Message (DENM). The two messages are generally generated in a time-varying way. For a CAM message, the default generation time is one message per second, but temporarily additional messages can be generated more frequently (for which the maximum frequency is 10 Hz) due to, for example, position change, speed change and/or direction change. A DENM message is always an event-triggered message. Considering the different categorizations above, to secure QoS for different packets it is necessary that the access stratum treat each packet from the application layer in a different way.

In Release 13, ProSe Per-Packet Priority (PPPP) is proposed as a means to provide priority for ProSe communication as described in 3GPP TS 23.303 v13.1.0, "Proximity-based services (ProSe)." The main functionality of this feature can be described as follows. PPPP is a scalar value associated with a protocol data unit (PDU) that defines the priority handling to be applied for transmission of that PDU. The ProSe Per-Packet Priority is independent of the Destination Layer-2 ID, and applies to both one-to-one and one-to-many ProSe Direct Communication. PPPP in Release 13 is defined only for ProSe communication via PC5 (the reference point between ProSe-enabled UEs used for control and user plane for ProSe Direct Discovery, ProSe Direct Communication and ProSeUE-to-Network Relay) and the bearer mapping between PC5 and Uu (the radio protocols of E-UTRAN between the UE and the eNodeB) for UE-NW relay. There might be a mapping between priority and the ProSe communication resource pool, with the details on the mapping for further study. Therefore, PPPP enables some kind of QoS. It is limited in some aspects, however, and thus not satisfactory for the V2X scenario.

SUMMARY

To address the foregoing problems with existing approaches, disclosed is a method in a node. The method comprises generating a tag for an associated data packet at a first layer, the generated tag indicating one or more parameters related to transmission of the associated data packet. The method comprises signaling the tag from the first layer to another layer. The method comprises mapping, at the another layer, the associated data packet to a logical channel based on the one or more parameters indicated by the tag. The method comprises selecting one or more resources for transmission of the associated data packet based on the mapping of the associated data packet to the logical channel.

In certain embodiments, the node may comprise one of: a wireless device; and a network node. The tag may be signaled from the first layer to the another layer as a bitmap. The first layer may be an application layer. The one or more parameters may comprise one or more of: a traffic type of the associated data packet; a periodicity of the associated data packet; a latency requirement of the associated data packet; a priority of the associated data packet; a type of device of the node; a presence of an external power source for the node; and a battery status of the node. The traffic type of the associated data packet may be indicated by a destination group. The periodicity of the associated data packet may be indicated by the priority of the associated data packet. In certain embodiments, the method may comprise selecting, based on the tag, one or more of: a power level for transmission of the associated data packet; and a transmission format for transmission of the associated data packet.

In certain embodiments, the method may comprise obtaining a mapping for use in mapping the associated data packet to the logical channel based on the one or more parameters indicated by the tag. Obtaining the mapping for use in mapping the associated data packet to the logical channel based on the one or more parameters indicated by the tag may comprise determining, by the node, the mapping for use in mapping the associated data packet to the logical channel based on the one or more parameters indicated by the tag. Obtaining the mapping for use in mapping the associated data packet to the logical channel based on the one or more parameters indicated by the tag may comprise receiving a mapping for use in mapping the associated data packet to the logical channel based on the tag.

In certain embodiments, mapping the associated data packet to a logical channel based on the one or more parameters indicated by the tag may comprise mapping the tag to a dedicated radio bearer. The mapping may comprise a one-to-one mapping. In certain embodiments, a plurality of tags can be mapped to a single dedicated radio bearer.

In certain embodiments, the method may comprise transmitting the associated data packet using the one or more resources selected for transmission of the associated data packet. The method may comprise transmitting the tag to one or more other nodes before the associated data packet is transmitted. In certain embodiments, the node may be a first node; the tag may be a first tag; the associated data packet may be a first associated data packet; and the method may comprise receiving, from a second node, a second tag for a second associated data packet before receiving the second associated data packet.

Also disclosed is a node. The node comprises one or more processors. The one or more processors are configured to generate a tag for an associated data packet at a first layer, the generated tag indicating one or more parameters related to transmission of the associated data packet. The one or more processors are configured to signal the tag from the first layer to another layer. The one or more processors are configured to map, at the another layer, the associated data packet to a logical channel based on the one or more parameters indicated by the tag. The one or more processors are configured to select one or more resources for transmission of the associated data packet based on the mapping of the associated data packet to the logical channel.

Certain embodiments of the present disclosure may provide one or more technical advantages. As one example, certain embodiments may advantageously help to implement quality of service in V2X scenarios. As another example, certain embodiments may advantageously enable awareness at the radio level of properties of the application and/or the transmitting device. As another example, certain embodiments may advantageously establish a framework for using the tags that is not limited to the sidelink and can be used to enforce quality of service or to introduce quality of service in other scenarios. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
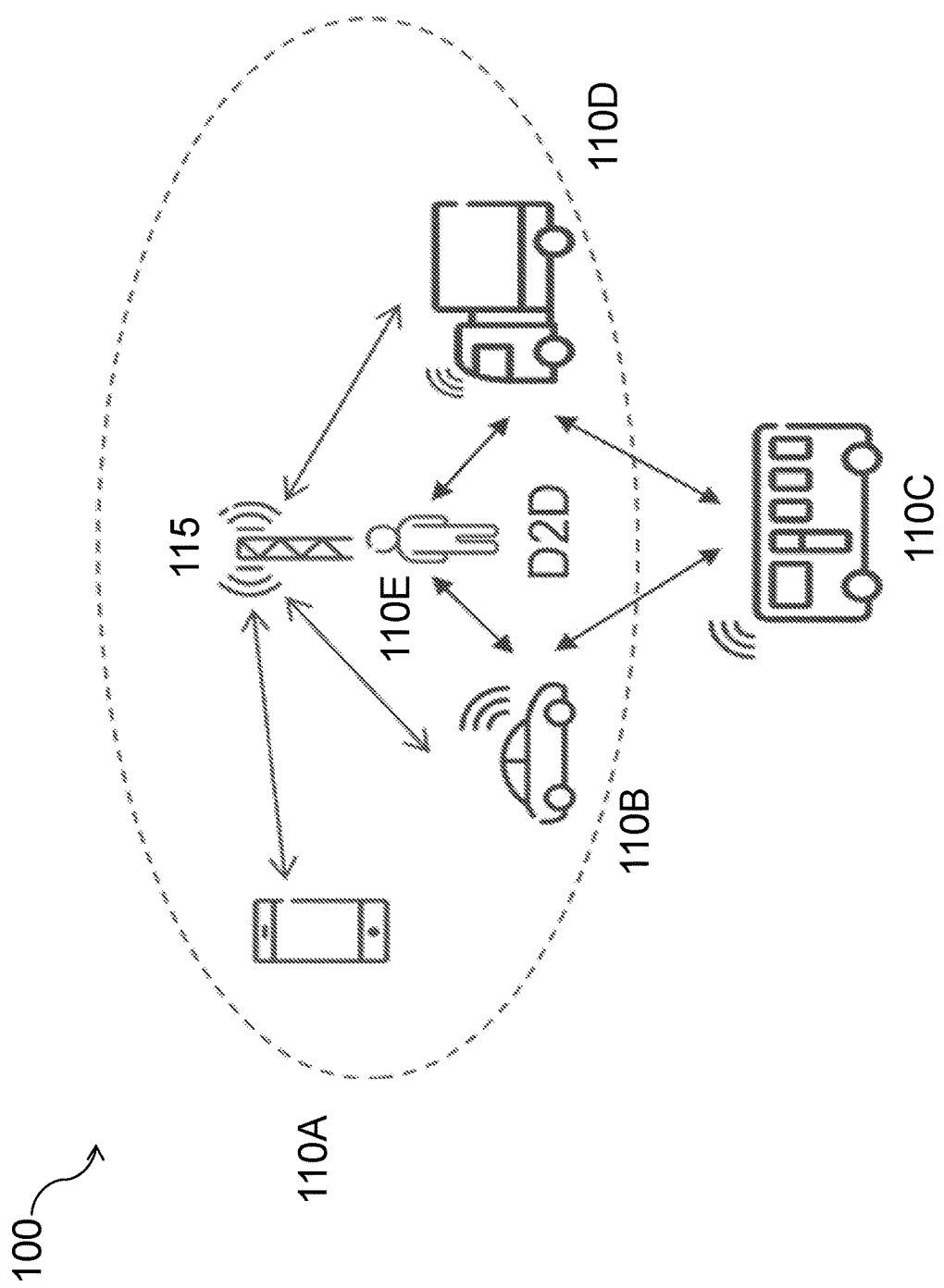
FIG. 1 is a block diagram illustrating an example embodiment of a network, in accordance with certain embodiments.

As described above, in order to secure QoS for different packets it is necessary for the access stratum to treat each packet from the application layer in a different way. Although PPPP has been proposed as a means to provide priority for ProSe communication, this approach is limited in some aspects and therefore not satisfactory for the V2x scenario. For example, to differentiate QoS for the various traffic types (e.g., V2V, V2P, V2I), the source and/or destination address/ID has to be taken as input factors, which is out of the scope of PPPP framework. Furthermore, PPPP is limited to the PC5 interface and UE-network relay (Uu-PC5 bearer mapping), while in a general case, both Uu and PC5 can be seen as an alternative route to deliver V2X messages and suffer from the impact of per-packet preference. The present disclosure contemplates various embodiments that may address these and other deficiencies associated with existing approaches.

In order to address the above described deficiencies with existing approaches, certain embodiments comprise an inter-layer signaling mechanism, typically from higher layers to lower layers in the protocol stack, that may advantageously enable implementation of per-packet resource pool selection in V2X scenarios. As used herein, the resource pool is a general item that is not limited to the resource pool used for ProSe communication, but also includes the alternative of a resource pool for Uu-based message delivery.

In certain embodiments, a tag is used that is per-packet defined and used by the access stratum to select a resource pool, which includes resource pools for both ProSe-based delivery and cellular-based delivery. For example, in certain embodiments a node generates a tag for an associated data packet at a first layer. The node may be any suitable entity. For example, and without limitation, in certain embodiments the node may be a wireless device or a network node (e.g., an RSU). In some cases, the first layer may be an application layer. The generated tag indicates one or more parameters related to transmission of the associated data packet. The node signals the tag from the first layer to another layer. At the another layer, the node maps the associated data packet to a logical channel based on the one or more parameters indicated by the tag. The node selects one or more resources for transmission of the associated data packet based on the mapping of the associated data packet to the logical channel. In certain embodiments, the node transmits the associated data packet using the one or more resources selected for transmission of the associated data packet.

Certain embodiments of the present disclosure may provide one or more technical advantages. As one example, certain embodiments may advantageously help to implement quality of service in V2X scenarios. As another example, certain embodiments may advantageously enable awareness at the radio level of properties of the application and/or the transmitting device. As another example, certain embodiments may advantageously establish a framework for using the tags that is not limited to the sidelink and can be used to enforce quality of service or to introduce quality of service in other scenarios. Other advantages may be readily apparent to one having skill in the art. Certain embodiments may have none, some, or all of the recited advantages.

FIG. 1 is a block diagram illustrating an example embodiment of a network, in accordance with certain embodiments. More particularly, FIG. 1 is a block diagram illustrating an embodiment of a network 100 that includes one or more wireless device(s) 110 (which may be interchangeably referred to as UEs 110) and network node 115 (which may be interchangeably referred to as eNB 115). In the example embodiment of FIG. 1, wireless device 110A is a smart phone, wireless devices 110B-D are vehicles, and wireless device 110E is a pedestrian having a wireless device 110, such as, for example, a smart phone. Wireless devices 110 may communicate with network node 115, or with one or more other wireless devices 110 over a wireless interface. For example, wireless devices 110A, 110B, and 110D may transmit wireless signals to network node 115 and/or receive wireless signals from network node 115. Wireless devices 110 may also transmit wireless signals to other wireless devices 110 and/or receive wireless signals from other wireless devices 110. For example, wireless devices 110B, 110C, 110D, and 110E may communicate using D2D communication. The wireless signals may contain voice traffic, data traffic, control signals, and/or any other suitable information. In some embodiments, an area of wireless signal coverage associated with a network node 115 may be referred to as a cell.

In certain embodiments, network node 115 may interface with a radio network controller. The radio network controller may control network node 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless device 110. Wireless device 110 may exchange certain signals with the core network node using the non-access stratum layer. In non-access stratum signaling, signals between wireless device 110 and the core network node may be transparently passed through the radio access network. In certain embodiments, network node 115 may interface with one or more network nodes over an internode interface, such as, for example, an X2 interface.

As described above, example embodiments of network 100 may include one or more wireless devices 110, and one or more different types of network nodes capable of communicating (directly or indirectly) with wireless devices 110.

In some embodiments, the non-limiting term wireless device (or UE) is used. Wireless devices 110 described herein can be any type of wireless device capable of communicating with network node 115 or another wireless device over radio signals. Wireless device 110 may also be a radio communication device, target device, D2D UE, an RSU, machine-type-communication UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), etc. Wireless device 110 may operate under either normal coverage or enhanced coverage with respect to its serving cell. The enhanced coverage may be interchangeably referred to as extended coverage. Wireless device 110 may also operate in a plurality of coverage levels (e.g., normal coverage, basic coverage, robust coverage, extreme coverage, enhanced coverage level 1, enhanced coverage level 2, enhanced coverage level 3 and so on). In some cases, wireless device 110 may also operate in out-of-coverage scenarios.

Also, in some embodiments generic terminology "network node" is used. It can be any kind of network node, which may comprise a base station (BS), radio base station, Node B, an RSU, multi-standard radio (MSR) radio node such as MSR BS, evolved Node B (eNB), network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME, etc.), O&M, OSS, SON, positioning node (e.g., E-SMLC), MDT, translation node (e.g., PLAT) or any other suitable network node.

The terminology such as network node and wireless device (and/or UE) should be considered non-limiting and does in particular not imply a certain hierarchical relation between the two; in general "eNodeB" could be considered as device 1 and "wireless device" device 2, and these two devices communicate with each other over some radio channel.

Example embodiments of wireless device 110, network node 115, and other network nodes (such as radio network controller or core network node) are described in more detail with respect to FIGS. 3-8 below.

Although FIG. 1 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). Furthermore, although certain embodiments may be described as implemented in an LTE network, the embodiments may be implemented in any appropriate type of telecommunication system supporting any suitable communication standards (including 5G standards) and using any suitable components, and are applicable to any radio access technology (RAT) or multi-RAT systems in which a wireless device receives and/or transmits signals (e.g., data). For example, the various embodiments described herein may be applicable to LTE, LTE-Advanced, 5G, UMTS, HSPA, GSM, cdma2000, WCDMA, WiMax, UMB, WiFi, another suitable radio access technology, or any suitable combination of one or more radio access technologies. Furthermore, although certain embodiments may be described in the context of V2X applications, the various embodiments may be advantageously applied to other applications.

As described above, V2X communication may include any combination of direct communication between vehicles, pedestrians, and infrastructure. FIG. 1 illustrates a variety of V2X scenarios in which the various embodiments of the present disclosure may be applied. As an example of V2I and/or V2N communication, wireless device 110A, 110B, and 110D may communicate wirelessly with network node 115, which may, for example, be an RSU. As an example of V2P communication, wireless devices 110B and 110D may communicate with a pedestrian associated with wireless device 110E. As an example of V2V communication, wireless devices 110B, 110C, and 110D may communicate wirelessly with each other.

Some of the example embodiments contemplated by the present disclosure will now be described more fully hereinafter with reference to the accompanying drawings. Other embodiments, however, are within the scope of this disclosure and the disclosure should not be construed as limited to only the example embodiments set forth herein. Rather, these embodiments are provided by way of example and not limitation. Like numbers refer to like elements throughout the description.

As discussed above, the radio layer is standardized. In principle, the same chipset could be used in different types of devices (e.g., wireless device 110 and network node 115). It is therefore desirable to enable the radio chipset to behave correctly in each of the scenarios described herein. In order to address the above described deficiencies with existing approaches, certain embodiments comprise an inter-layer signaling mechanism, typically from higher layers to lower layers in the protocol stack. One objective is to enable awareness at the radio level of any combination of, for example, the following properties of the application and/or the transmitting device: radio requirements of the traffic; radio properties of the traffic; type of device (e.g., RSU, handheld device, vehicle-mounted device, emergency vehicle-mounted device, etc.); additional constraints in the device (e.g., presence of external power source, low battery status, etc.). In some scenarios, information about the type of device (as well as constraints in the device or other suitable information) may be known at application level (e.g., different software installed depending on the type of device).

The transmitter radio layers can take into account the information obtained by the higher layers and operate accordingly. For example, the resources for transmission of V2X signals (i.e., resource pool), the power level, the transmission format, etc. can be selected based on the above parameters. In certain embodiments, this selection may be based on some configurable or predetermined mapping or rule. In some cases, the QoS optimization based on the adjustable behavior is possible even within a given bearer type.

In certain embodiments, a node, such as wireless device 110 or network node 115, may generate a tag for an associated data packet at a first layer. The generated tag indicates one or more parameters related to transmission of the associated data packet. In some cases, the first layer may be an application layer. In such a scenario, the tag may be defined in any suitable manner. In some cases, the tag may comprise information included in a header of the associated data packet. Alternatively, the tag may be included in control signaling and/or scheduling assignments.

Being per-packet defined, the generated tag can be used to reflect multiple factors other than (or in addition to) priority. As one example, the tag can be used to reflect traffic type. This can be used, for example, to differentiate traffic between V2V, V2P, and/or V2I/N. As another example, the tag can be used to reflect periodicity. This can be used, within each traffic type, to differentiate packets according to different inter-arrival time. To illustrate, consider the following example involving three CAM messages. Assume that three CAM messages may arrive in the order of A-B-C with a 500 ms interval in-between. CAM messages A and C may be tagged as 1 second-periodicity packets, while CAM message B may be tagged as 0.5 second-periodicity packets. Since CAM messages use 1 second as the mandatory periodicity, and CAM message B is triggered in a temporary way, CAM message B may be treated as lower priority compared with CAM messages A and C.

As another example, the generated tag can be used to reflect latency. The latency requirement may vary in different scenarios. For example, whether the packet is a periodic message (e.g., a CAM message) or an event-triggered message (e.g., DENM message). As still another example, the generated tag can be used to reflect priority. In such a case, the tag may also include prioritization between packets belonging to the same traffic type and having the same latency requirements that can be distinguished by different priorities.

In some cases, the tag can correspond to a combination of, for example, the above factors and any other suitable factors. Tags that are frequently used can be compressed more than others. In certain embodiments, network nodes 115 and/or wireless device 110 can have the possibility to learn over time the frequently used combinations, thus affecting the mapping of tags to certain combinations of requirements.

In certain embodiments, the node (e.g., wireless device 110 or network node 115) signals the tag from the first layer (e.g., application layer) to another layer (e.g., medium access control (MAC) layer). This may allow further optimization to be achieved by taking advantage of the interdependency between the sets of practically useful parameters. For example, an RSU-type of node may only be compatible with certain applications and certain traffic parameters, etc. With the generated tag, it is possible to encode the space of useful parameters into a compact mapping where only combinations of parameters of practical interest can be signalled. The present disclosure contemplates that the signalling may be done in any suitable manner. For example, signalling may be done by using a bitmap carried in some field in a protocol that can be read by the radio layers. This is one example of the tag, which corresponds to the packets being exchanged. Similarly, the signalling can be done with some control procedure that does not necessarily rely on headers included in the data packets. For instance, a tag related to a certain packet can be signalled over the radio layer before the actual transmission of the packet, thereby allowing wireless devices 110 in the surrounding area to read the tag, which in turn can be used for congestion/floor control policies.

At the another layer, the associated data packet is mapped to a logical channel based on the one or more parameters indicated by the tag. In some cases, the another layer may be the MAC layer. The mapping may be performed in any suitable manner. In certain embodiments, the node obtains a mapping for use in mapping the associated data packet to the logical channel based on the one or more parameters indicated by the tag. In some cases, the node may determine the mapping for use in mapping the associated data packet to the logical channel based on the one or more parameters indicated by the tag. In some cases, the node receives a mapping for use in mapping the associated data packet to the logical channel based on the tag. Mapping the associated data packet to a logical channel based on the one or more parameters indicated by the tag may comprise mapping the tag to a dedicated radio bearer. The mapping may be a one-to-one mapping. In some cases, a plurality of tags may be mapped to a single dedicated radio bearer.

In certain embodiments, tags can be mapped to dedicated radio barriers, and the mapping may take any suitable form. For example, in certain embodiments the mapping could include a one-to-one mapping, or one bearer can be shared over many tags including cellular traffic.

The application layer to logical channel mapping may take place in any suitable manner. For example, in Release 12, the ProSe logical channels are differentiated by source and destination L2 address. In some cases, to enable the per-packet tag, the different traffic types may be reflected as different destination groups (for example, for packets originated by vehicles, different destination groups would be used to carry V2V, V2P and V2I messages), so that different logical channels to be used.

As another example, the different periodicity may be reflected as different priority, and may rely on the mapping between priority and logical channel to select the logical channel. To illustrate, recall the example described above in which three CAM messages may arrive in the order of A-B-C with a 500 ms interval in-between. Since CAM messages use 1 second as the mandatory periodicity, and CAM message B is triggered in a temporary way, CAM message B may be treated as lower priority compared with CAM messages A and C. Accordingly, because A and C are treated as having higher priority, CAM messages A and C may be mapped to a logical channel carrying high priority traffic.

As still another example, the Uu-based logical channel is also seen as candidate for this mapping. The Uu-based logical channel can be seen as a logical channel limited to a specific traffic type and priority level. The detailed mapping rule can be determined in any suitable manner. For example, in certain embodiments, the detailed mapping rule can be decided by a wireless device 110, or may be configurable by network signaling (e.g., using system information block (SIB) or radio resource control (RRC) dedicated signaling). In certain embodiments, the priority and traffic type to resource pool mapping can be configurable by network signalling (such as, for example, SIB or dedicated RRC signalling).

Once the associated data packet is mapped to a logical channel based on the one or more parameters indicated by the tag, the node selects one or more resources for transmission of the associated data packet based on the mapping of the associated data packet to the logical channel. The resource pool may be differentiated in any suitable manner. For example, in certain embodiments the resource pool may be differentiated in terms of: the priority of traffic allowed to be delivered using this pool; the traffic type (or may be in form of group ID) allowed to be delivered using this pool; and/or in any other suitable manner.

The node may then transmit the associated data packet using the one or more resources selected for transmission of the associated data packet. In some cases, the node may transmit the tag to one or more other nodes before the associated data packet is transmitted. In certain embodiments, the node may receive, from a second node, a second tag for a second associated data packet before receiving the second associated data packet.

Certain of the concepts described herein have been described with reference to a few embodiments. However, as is readily appreciated by a person skilled in the art, embodiments other than the ones disclosed above are equally possible and within the scope of the present disclosure. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

Figure 2:
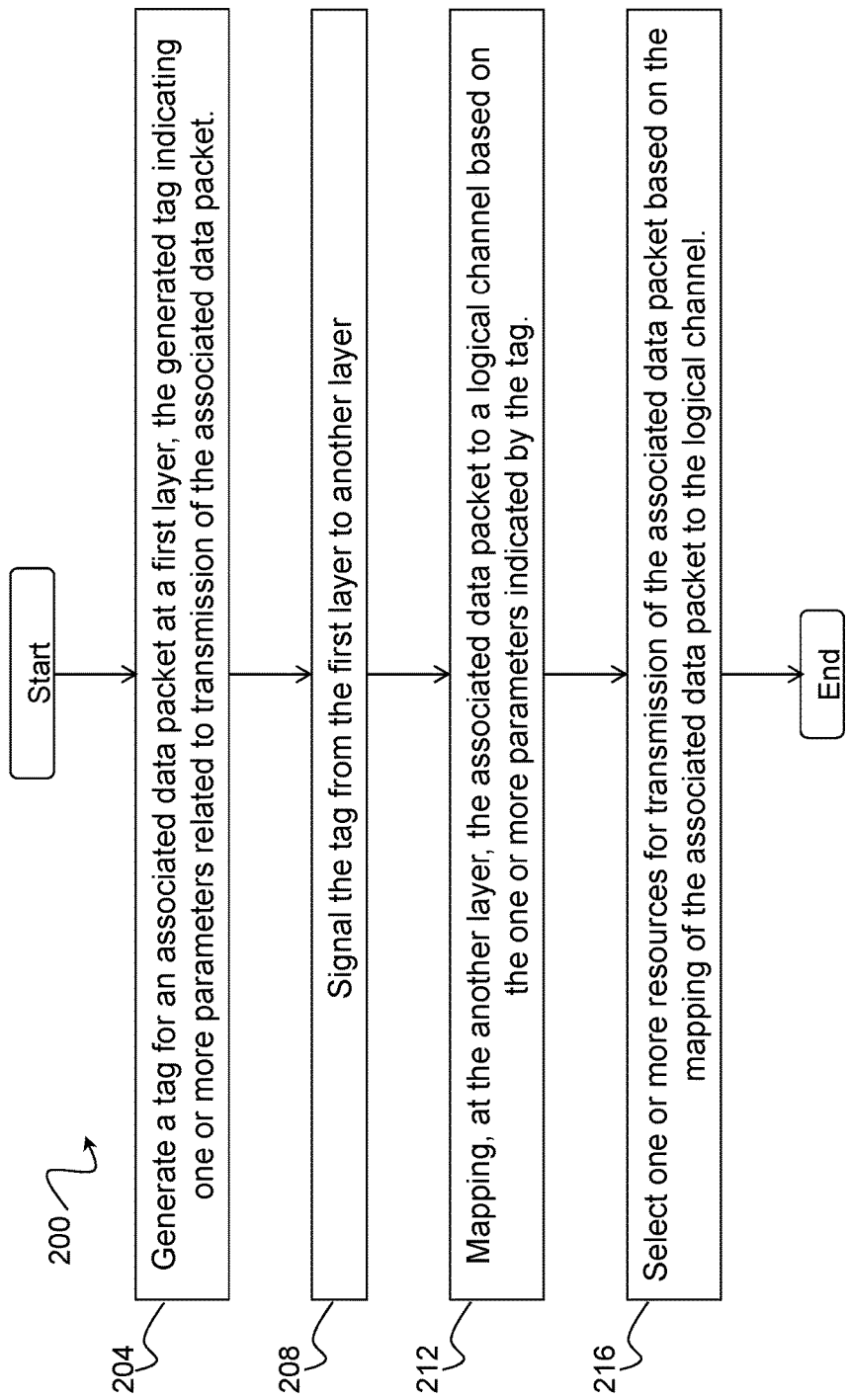
FIG. 2 is a flow diagram of a method in a node, in accordance with certain embodiments.

FIG. 2 is a flow diagram of a method 200 in a node, in accordance with certain embodiments. The method begins at step 204, where the node generates a tag for an associated data packet at a first layer, the generated tag indicating one or more parameters related to transmission of the associated data packet. In certain embodiments, the node may comprise one of: a wireless device; and a network node. In some cases, the first layer may be an application layer. The one or more parameters may comprise one or more of: a traffic type of the associated data packet; a periodicity of the associated data packet; a latency requirement of the associated data packet; a priority of the associated data packet; a type of device of the node; a presence of an external power source for the node; and a battery status of the node. In some cases, the traffic type of the associated data packet may be indicated by a destination group. In some cases, the periodicity of the associated data packet may be indicated by the priority of the associated data packet.

At step 208, the tag is signaled from the first layer to another layer. In certain embodiments, the tag may be signaled from the first layer to the another layer as a bitmap.

At step 212, the associated data packet is mapped, at the another layer, to a logical channel based on the one or more parameters indicated by the tag. In certain embodiments, mapping the associated data packet to a logical channel based on the one or more parameters indicated by the tag may comprise mapping the tag to a dedicated radio bearer. In some cases, the mapping may comprise a one-to-one mapping. In some cases, a plurality of tags may be mapped to a single dedicated radio bearer. In certain embodiments, the method may comprise obtaining a mapping for use in mapping the associated data packet to the logical channel based on the one or more parameters indicated by the tag. In some cases, obtaining the mapping for use in mapping the associated data packet to the logical channel based on the one or more parameters indicated by the tag may comprise determining, by the node, the mapping for use in mapping the associated data packet to the logical channel based on the one or more parameters indicated by the tag. In some cases, obtaining the mapping for use in mapping the associated data packet to the logical channel based on the one or more parameters indicated by the tag may comprise receiving a mapping for use in mapping the associated data packet to the logical channel based on the tag.

At step 216, one or more resources are selected for transmission of the associated data packet based on the mapping of the associated data packet to the logical channel. In certain embodiments, the method may comprise transmitting the associated data packet using the one or more resources selected for transmission of the associated data packet. In some cases, the method may comprise transmitting the tag to one or more other nodes before the associated data packet is transmitted.

In certain embodiments, the method may comprise selecting, based on the tag, one or more of: a power level for transmission of the associated data packet; and a transmission format for transmission of the associated data packet. In certain embodiments, the node may be a first node, the tag may be a first tag, and the associated data packet may be a first associated data packet. The method may comprise receiving, from a second node, a second tag for a second associated data packet before receiving the second associated data packet.

Figure 3:
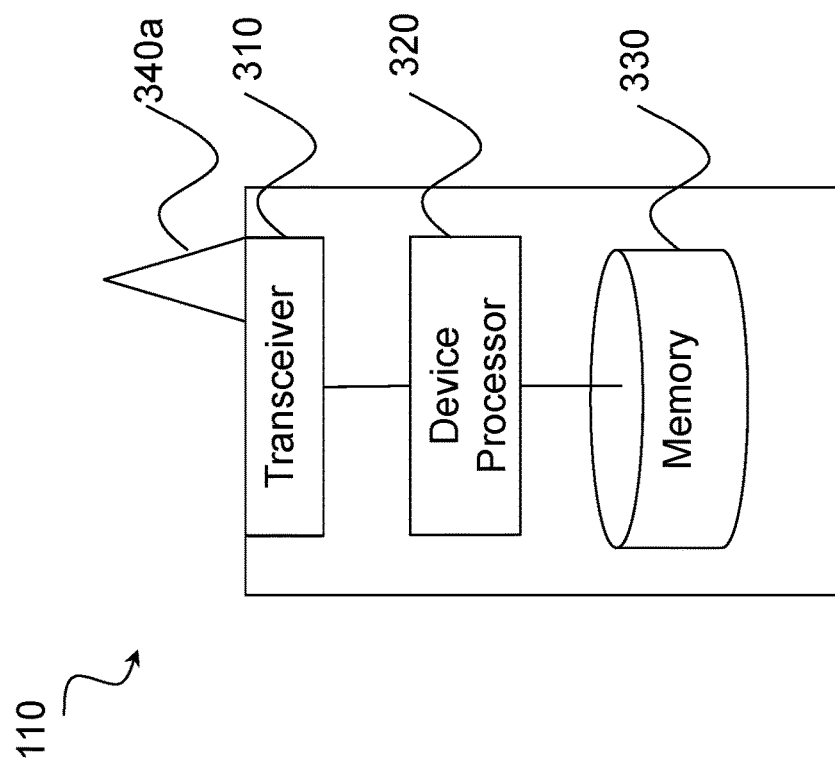
FIG. 3 is a block schematic of an exemplary wireless device, in accordance with certain embodiments.

FIG. 3 is a block schematic of an exemplary wireless device, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, an RSU, or another device that can provide wireless communication. A wireless device 110 may also be referred to as UE, a station (STA), a device, or a terminal in some embodiments. Wireless device 110 includes transceiver 310, processor 320, and memory 330. In some embodiments, transceiver 310 facilitates transmitting wireless signals to and receiving wireless signals from network node 115 (e.g., via antenna 340a), processor 320 executes instructions to provide some or all of the functionality described above as being provided by wireless device 110, and memory 330 stores the instructions executed by processor 320.

Processor 320 may include any suitable combination of hardware and software implemented in one or more modules to execute instructions and manipulate data to perform some or all of the described functions of wireless device 110, such as the functions of wireless device 110 described above in relation to FIGS. 1-2. In some embodiments, processor 320 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 330 is generally operable to store instructions, such as a computer program, software, an application including one or more of logic, rules, algorithms, code, tables, etc. and/or other instructions capable of being executed by a processor. Examples of memory 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 320.

Other embodiments of wireless device 110 may include additional components beyond those shown in FIG. 3 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processor 320. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 4:
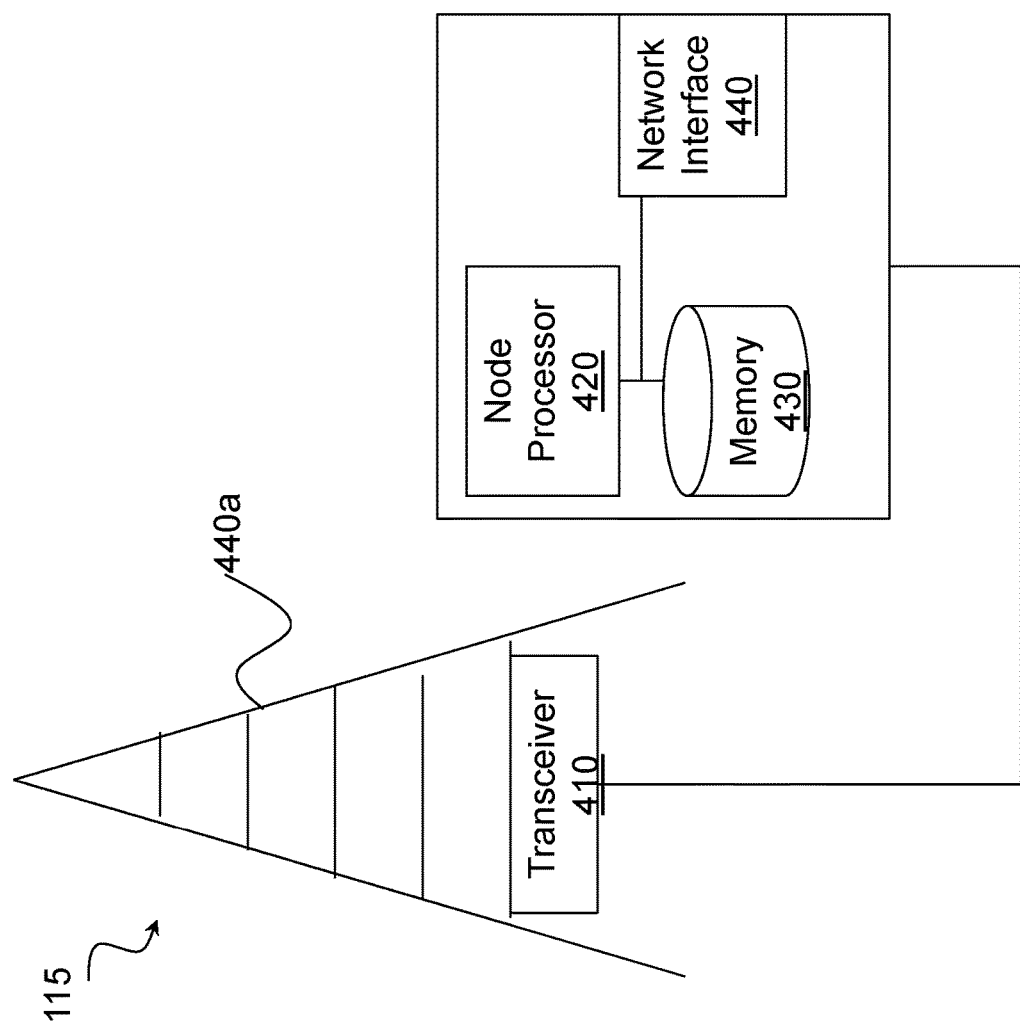
FIG. 4 is a block schematic of an exemplary network node, in accordance with certain embodiments.

FIG. 4 is a block schematic of an exemplary network node, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, an RSU, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 410, processor 420, memory 430, and network interface 440. In some embodiments, transceiver 410 facilitates transmitting wireless signals to and receiving wireless signals from wireless device 110 (e.g., via antenna 440a), processor 420 executes instructions to provide some or all of the functionality described above as being provided by a network node 115, memory 430 stores the instructions executed by processor 420, and network interface 440 communicates signals to backend network components, such as a gateway, switch, router, Internet, Public Switched Telephone Network (PSTN), core network nodes or radio network controllers 130, etc.

Processor 420 may include any suitable combination of hardware and software implemented in one or more modules to execute instructions and manipulate data to perform some or all of the described functions of network node 115, such as those described above in relation to FIGS. 1-2 above. In some embodiments, processor 420 may include, for example, one or more computers, one or more central processing units (CPUs), one or more microprocessors, one or more applications, and/or other logic.

Memory 430 is generally operable to store instructions, such as a computer program, software, an application including one or more of logic, rules, algorithms, code, tables, etc. and/or other instructions capable of being executed by a processor. Examples of memory 430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 440 is communicatively coupled to processor 420 and may refer to any suitable device operable to receive input for network node 115, send output from network node 115, perform suitable processing of the input or output or both, communicate to other devices, or any combination of the preceding. Network interface 440 may include appropriate hardware (e.g., port, modem, network interface card, etc.) and software, including protocol conversion and data processing capabilities, to communicate through a network.

Other embodiments of network node 115 may include additional components beyond those shown in FIG. 4 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 5:
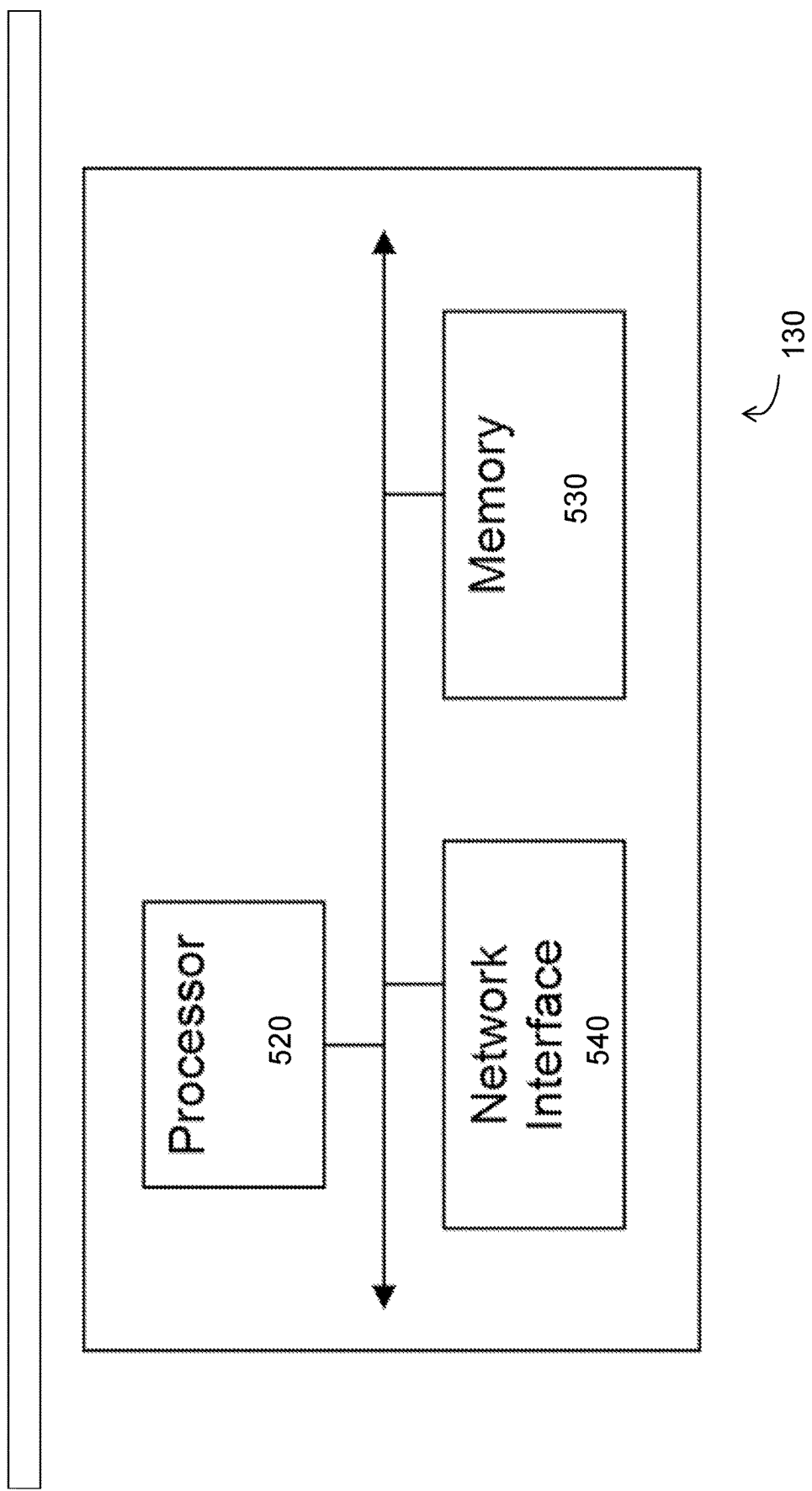
FIG. 5 is a block schematic of an exemplary radio network controller or core network node, in accordance with certain embodiments.

FIG. 5 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processor 520, memory 530, and network interface 540. In some embodiments, processor 520 executes instructions to provide some or all of the functionality described above as being provided by the network node, memory 530 stores the instructions executed by processor 520, and network interface 540 communicates signals to any suitable node, such as a gateway, switch, router, Internet, Public Switched Telephone Network (PSTN), network nodes 115, radio network controllers or core network nodes 130, etc.

Processor 520 may include any suitable combination of hardware and software implemented in one or more modules to execute instructions and manipulate data to perform some or all of the described functions of the radio network controller or core network node 130. In some embodiments, processor 520 may include, for example, one or more computers, one or more central processing units (CPUs), one or more microprocessors, one or more applications, and/or other logic.

Memory 530 is generally operable to store instructions, such as a computer program, software, an application including one or more of logic, rules, algorithms, code, tables, etc. and/or other instructions capable of being executed by a processor. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 540 is communicatively coupled to processor 520 and may refer to any suitable device operable to receive input for the network node, send output from the network node, perform suitable processing of the input or output or both, communicate to other devices, or any combination of the preceding. Network interface 540 may include appropriate hardware (e.g., port, modem, network interface card, etc.) and software, including protocol conversion and data processing capabilities, to communicate through a network.

Other embodiments of the network node may include additional components beyond those shown in FIG. 5 that may be responsible for providing certain aspects of the network node's functionality, including any of the functionality described above and/or any additional functionality (including any functionality necessary to support the solution described above).

Figure 6:
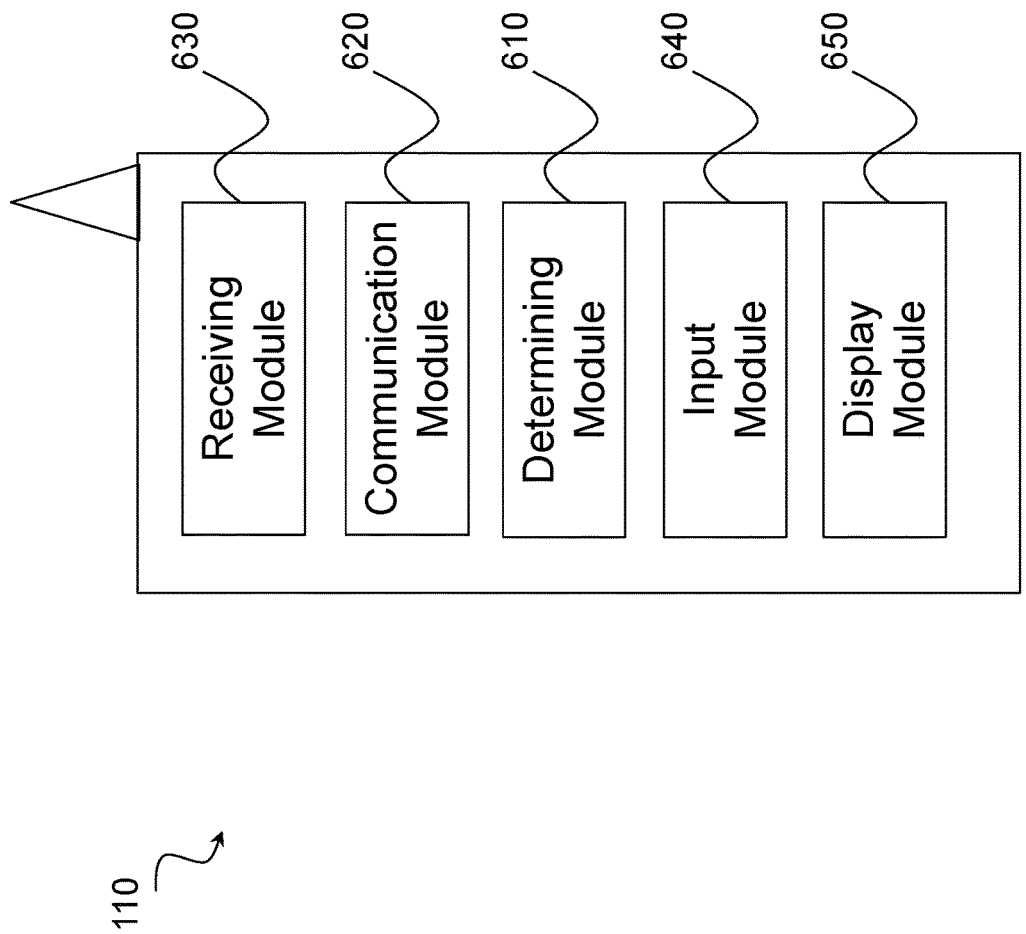
FIG. 6 is a block schematic of an exemplary wireless device, in accordance with certain embodiments.

FIG. 6 is a block schematic of an exemplary wireless device, in accordance with certain embodiments. Wireless device 110 may include one or more modules. For example, wireless device 110 may include a determining module 610, a communication module 620, a receiving module 630, an input module 640, a display module 650, and any other suitable modules. Wireless device 110 may perform the methods for per-packet resource pool selection described above with respect to FIGS. 1-2.

Determining module 610 may perform the processing functions of wireless device 110. As one example, determining module 610 may generate a tag for an associated data packet at a first layer, the generated tag indicating one or more parameters related to transmission of the associated data packet. As another example, determining module 610 may map, at the another layer, the associated data packet to a logical channel based on the one or more parameters indicated by the tag. As still another example, determining module 610 may select one or more resources for transmission of the associated data packet based on the mapping of the associated data packet to the logical channel. As yet another example, determining module 610 may select, based on the tag, one or more of: a power level for transmission of the associated data packet; and a transmission format for transmission of the associated data packet. As yet another example, determining module 610 may obtain a mapping for use in mapping the associated data packet to the logical channel based on the one or more parameters indicated by the tag. In certain embodiments, in obtaining the mapping for use in mapping the associated data packet to the logical channel based on the one or more parameters indicated by the tag, determining module 610 may determine the mapping for use in mapping the associated data packet to the logical channel based on the one or more parameters indicated by the tag.

Determining module 610 may include or be included in one or more processors, such as processor 320 described above in relation to FIG. 3. Determining module 610 may include analog and/or digital circuitry configured to perform any of the functions of determining module 610 and/or processor 320 described above. The functions of determining module 610 described above may, in certain embodiments, be performed in one or more distinct modules.

Communication module 620 may perform the transmission functions of wireless device 110. For example, communication module 620 may signal the tag from the first layer to another layer. As another example, communication module 620 may transmit the associated data packet using the one or more resources selected for transmission of the associated data packet. As still another example, communication module 620 may transmit the tag to one or more other nodes before the associated data packet is transmitted. Communication module 620 may transmit messages to one or more of network nodes 115 of network 100. Communication module 620 may include a transmitter and/or a transceiver, such as transceiver 310 described above in relation to FIG. 3. Communication module 620 may include circuitry configured to wirelessly transmit messages and/or signals. In particular embodiments, communication module 620 may receive messages and/or signals for transmission from determining module 610. In certain embodiments, the functions of communication module 620 described above may be performed in one or more distinct modules.

Receiving module 630 may perform the receiving functions of wireless device 110. As one example, receiving module 630 may obtain a mapping for use in mapping the associated data packet to the logical channel based on the one or more parameters indicated by the tag. In certain embodiments, in obtaining the mapping for use in mapping the associated data packet to the logical channel based on the one or more parameters indicated by the tag, receiving module 630 may receive a mapping for use in mapping the associated data packet to the logical channel based on the tag. As another example, receiving module 630 may receive, from a second node, a second tag for a second associated data packet before receiving the second associated data packet. Receiving module 630 may include a receiver and/or a transceiver, such as transceiver 310 described above in relation to FIG. 3. Receiving module 630 may include circuitry configured to wirelessly receive messages and/or signals. In particular embodiments, receiving module 630 may communicate received messages and/or signals to determining module 610.

Input module 640 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 610.

Display module 650 may present signals on a display of wireless device 110. Display module 650 may include the display and/or any appropriate circuitry and hardware configured to present signals on the display. Display module 650 may receive signals to present on the display from determining module 610.

Determining module 610, communication module 620, receiving module 630, input module 640, and display module 650 may include any suitable configuration of hardware and/or software. Wireless device 110 may include additional modules beyond those shown in FIG. 6 that may be responsible for providing any suitable functionality, including any of the functionality described above and/or any additional functionality (including any functionality necessary to support the various solutions described herein).

Figure 7:
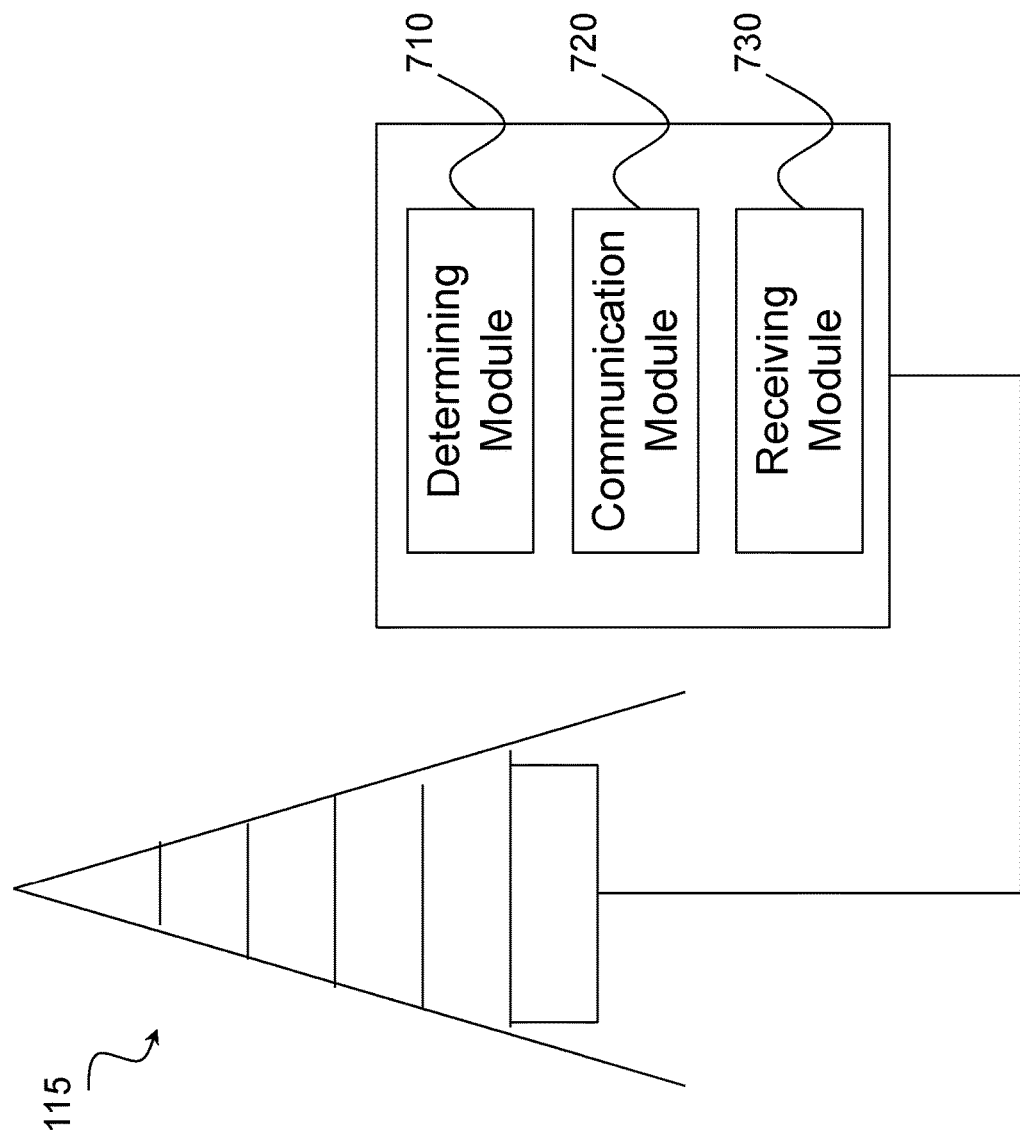
FIG. 7 is a block schematic of an exemplary network node, in accordance with certain embodiments.

FIG. 7 is a block schematic of an exemplary network node 115, in accordance with certain embodiments. Network node 115 may include one or more modules. For example, network node 115 may include determining module 710, communication module 720, receiving module 730, and any other suitable modules. In some embodiments, one or more of determining module 710, communication module 720, receiving module 730, or any other suitable module may be implemented using one or more processors, such as processor 420 described above in relation to FIG. 4. In certain embodiments, the functions of two or more of the various modules may be combined into a single module. Network node 115 may perform the methods for per-packet resource pool selection described above with respect to FIGS. 1-2.

Determining module 710 may perform the processing functions of network node 115. For example, determining module 710 may generate a tag for an associated data packet at a first layer, the generated tag indicating one or more parameters related to transmission of the associated data packet. As another example, determining module 710 may map, at the another layer, the associated data packet to a logical channel based on the one or more parameters indicated by the tag. As still another example, determining module 710 may select one or more resources for transmission of the associated data packet based on the mapping of the associated data packet to the logical channel. As yet another example, determining module 710 may select, based on the tag, one or more of: a power level for transmission of the associated data packet; and a transmission format for transmission of the associated data packet. As yet another example, determining module 710 may obtain a mapping for use in mapping the associated data packet to the logical channel based on the one or more parameters indicated by the tag. In certain embodiments, in obtaining the mapping for use in mapping the associated data packet to the logical channel based on the one or more parameters indicated by the tag, determining module 710 may determine the mapping for use in mapping the associated data packet to the logical channel based on the one or more parameters indicated by the tag.

Determining module 710 may include or be included in one or more processors, such as processor 420 described above in relation to FIG. 4. Determining module 710 may include analog and/or digital circuitry configured to perform any of the functions of determining module 710 and/or processor 420 described above. The functions of determining module 710 may, in certain embodiments, be performed in one or more distinct modules. For example, in certain embodiments some of the functionality of determining module 710 may be performed by an allocation module.

Communication module 720 may perform the transmission functions of network node 115. As one example, communication module 720 may signal the tag from the first layer to another layer. As another example, communication module 720 may transmit the associated data packet using the one or more resources selected for transmission of the associated data packet. As still another example, communication module 720 may transmit the tag to one or more other nodes before the associated data packet is transmitted. Communication module 720 may transmit messages to one or more of wireless devices 110. Communication module 720 may include a transmitter and/or a transceiver, such as transceiver 410 described above in relation to FIG. 4. Communication module 720 may include circuitry configured to wirelessly transmit messages and/or signals. In particular embodiments, communication module 720 may receive messages and/or signals for transmission from determining module 710 or any other module.

Receiving module 730 may perform the receiving functions of network node 115. For example, receiving module 730 may obtain a mapping for use in mapping the associated data packet to the logical channel based on the one or more parameters indicated by the tag. In certain embodiments, in obtaining the mapping for use in mapping the associated data packet to the logical channel based on the one or more parameters indicated by the tag, receiving module 730 may receive a mapping for use in mapping the associated data packet to the logical channel based on the tag. As another example, receiving module 730 may receive, from a second node, a second tag for a second associated data packet before receiving the second associated data packet. Receiving module 730 may receive any suitable information from a wireless device. Receiving module 730 may include a receiver and/or a transceiver, such as transceiver 410 described above in relation to FIG. 4. Receiving module 730 may include circuitry configured to wirelessly receive messages and/or signals. In particular embodiments, receiving module 730 may communicate received messages and/or signals to determining module 710 or any other suitable module.

Determining module 710, communication module 720, and receiving module 730 may include any suitable configuration of hardware and/or software. Network node 115 may include additional modules beyond those shown in FIG. 7 that may be responsible for providing any suitable functionality, including any of the functionality described above and/or any additional functionality (including any functionality necessary to support the various solutions described herein).

Figure 8:
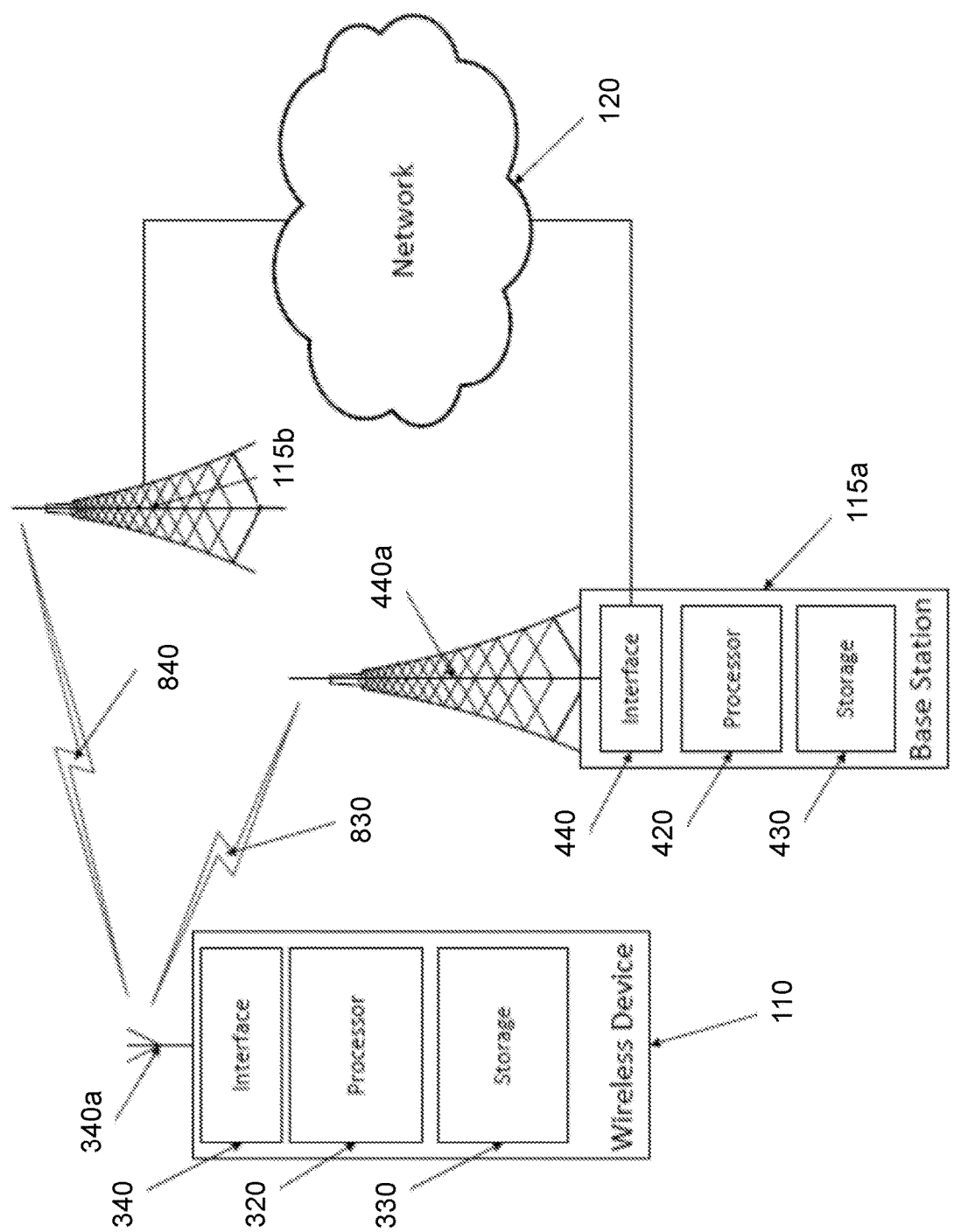
FIG. 8 is a block diagram illustrating another example embodiment of a network, in accordance with certain embodiments.

FIG. 8 is a block diagram illustrating an example embodiment of a network, in accordance with certain embodiments. More particularly, FIG. 8 illustrates a wireless network comprising a detailed view of wireless device 110 and network nodes 115. For simplicity, FIG. 8 only depicts network 120, network nodes 115*a* and 115*b*, and wireless device 110. Wireless device 110 and network nodes 115*a* and 115*b* may perform the methods for per-packet resource pool selection described above with respect to FIGS. 1-2.

In the example embodiment of FIG. 8, network node 115*a* comprises interface 440, processor 420, storage 430, and antenna 440*a*. Similarly, wireless device 110 comprises interface 340, processor 320, storage 330, and antenna 340*a*. These components may work together in order to provide network node and/or wireless device functionality, such as providing wireless connections in a wireless network. In different embodiments, network 120 may comprise any number of wired or wireless networks, network nodes, base stations, controllers, wireless devices, relay stations, and/or any other components that may facilitate or participate in the communication of data and/or signals whether via wired or wireless connections.

Network 120 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Network node 115*a* comprises interface 440, processor 420, storage 430, and antenna 440*a*. These components are depicted as single boxes located within a single larger box. In practice however, network node 115*a* may comprise multiple different physical components that make up a single illustrated component (e.g., interface 440 may comprise terminals for coupling wires for a wired connection and a radio transceiver for a wireless connection). Similarly, network node 115*a* may be composed of multiple physically separate components (e.g., a NodeB component and a Radio Network Controller (RNC) component, a base transceiver station (BTS) component and a base station controller (BSC) component, etc.), which may each have their own respective processor, storage, and interface components. In certain scenarios in which network node 115a comprises multiple separate components (e.g., BTS and BSC components), one or more of the separate components may be shared among several network nodes. For example, a single RNC may control multiple NodeBs. In such a scenario, each unique NodeB and BSC pair may be a separate network node. In some embodiments, network node 115a may be configured to support multiple radio access technologies (RATs). In such embodiments, some components may be duplicated (e.g., separate storage 430 for the different RATs) and some components may be reused (e.g., the same antenna 440a may be shared by the RATs).

Processor 420 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 200 components, such as storage 430, network node 200 functionality. For example, processor 420 may execute instructions stored in storage 430. Such functionality may include providing various wireless features discussed herein to a wireless devices, such as wireless device 110a, including any of the features or benefits disclosed herein.

Storage 430 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 430 may store any suitable instructions, data or information, including software and encoded logic, utilized by network node 200. Storage 430 may be used to store any calculations made by processor 420 and/or any data received via interface 440.

Network node 115a also comprises interface 440 which may be used in the wired or wireless communication of signalling and/or data between network node 115a, network 120, and/or wireless device 110. For example, interface 440 may perform any formatting, coding, or translating that may be needed to allow network node 115a to send and receive data from network 120 over a wired connection. Interface 440 may also include a radio transmitter and/or receiver that may be coupled to or a part of antenna 440a. The radio may receive digital data that is to be sent out to other network nodes or wireless devices via a wireless connection. The radio may convert the digital data into a radio signal having the appropriate channel and bandwidth parameters. The radio signal may then be transmitted via antenna 440a to the appropriate recipient (e.g., wireless device 110).

Antenna 440a may be any type of antenna capable of transmitting and receiving data and/or signals wirelessly. In some embodiments, antenna 440a may comprise one or more omni-directional, sector or panel antennas operable to transmit/receive radio signals between, for example, 2 GHz and 66 GHz. An omni-directional antenna may be used to transmit/receive radio signals in any direction. A sector antenna may be used to transmit/receive radio signals from devices within a particular area. A panel antenna may be a line of sight antenna used to transmit/receive radio signals in a relatively straight line.

Wireless device 110 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 115a and/or other wireless devices. Wireless device 110 comprises processor 320, storage 330, interface 340, and antenna 340a. Like network node 115a, the components of wireless device 110 are depicted as single boxes located within a single larger box, however in practice a wireless device may comprises multiple different physical components that make up a single illustrated component (e.g., storage 330 may comprise multiple discrete microchips, each microchip representing a portion of the total storage capacity).

Processor 320 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other wireless device 110 components, such as storage 330, wireless device 110 functionality. Such functionality may include providing various wireless features discussed herein, including any of the features or benefits disclosed herein.

Storage 330 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 330 may store any suitable data, instructions, or information, including software and encoded logic, utilized by wireless device 210. Storage 330 may be used to store any calculations made by processor 320 and/or any data received via interface 340.

Interface 340 may be used in the wireless communication of signalling and/or data between wireless device 110 and network node 115a. For example, interface 340 may perform any formatting, coding, or translating that may be needed to allow wireless device 110 to send and receive data from network node 115a over a wireless connection. Interface 340 may also include a radio transmitter and/or receiver that may be coupled to or a part of antenna 340a. The radio may receive digital data that is to be sent out to network node 115a via a wireless connection. The radio may convert the digital data into a radio signal having the appropriate channel and bandwidth parameters. The radio signal may then be transmitted via antenna 340a to network node 115a.

Antenna 340a may be any type of antenna capable of transmitting and receiving data and/or signals wirelessly. In some embodiments, antenna 340a may comprise one or more omni-directional, sector or panel antennas operable to transmit/receive radio signals between 2 GHz and 66 GHz. For simplicity, antenna 340a may be considered a part of interface 340 to the extent that a wireless signal is being used.

Any appropriate steps, methods, or functions may be performed through a computer program product that may, for example, be executed by the components and equipment illustrated in the figure above. For example, storage 430 may comprise computer readable means on which a computer program can be stored. The computer program may include instructions which cause processor 420 (and any operatively coupled entities and devices, such as interface 440 and storage 430) to execute methods according to embodiments described herein. The computer program and/or computer program product may thus provide means for performing any steps herein disclosed.

Any appropriate steps, methods, or functions may be performed through one or more functional modules, such as the various modules described above with respect to FIGS. 6 and 7. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processors 320 and/or 420, possibly in cooperation with storage 330 and/or 430. Processors 320 and/or 420 and storage 330 and/or 430 may thus be arranged to allow processors 320 and/or 420 to fetch instructions from storage 330 and/or 430 and execute the fetched instructions to allow the respective functional module to perform any steps or functions disclosed herein.

It is to be noted that any feature of any of the embodiments disclosed herein may be applied to any other embodiment, wherever appropriate. Likewise, any advantage of any of the embodiments may apply to the other embodiments, and vice versa. Other objectives, features and advantages of the enclosed embodiments will be apparent from the following description.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order. Any steps described herein are merely illustrative of certain embodiments. It is not required that all embodiments incorporate all the steps disclosed nor that the steps be performed in the exact order depicted or described herein. Furthermore, some embodiments may include steps not illustrated or described herein, including steps inherent to one or more of the steps disclosed herein.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
3 GPP Third Generation Partnership Project
AP Access Point
BS Base Station
BSC Base Station Controller
BTS Base Transceiver Station
CAM Cooperative Awareness Message
CDM Code Division Multiplexing
CPE Customer Premises Equipment
D2D Device-to-device
DAS Distributed Antenna System
DENM Decentralized Environmental Notification Message
DL Downlink
DSRC Dedicated Short-Range Communications
E2E End-to-End
eNB evolved Node B
EPDCCH Enhanced Physical Downlink Control Channel
ETSI European Telecommunications Standards Institute
E-UTRAN Evolved Universal Terrestrial Access Network
FDD Frequency Division Duplex
InC In-coverage
ITS Intelligent Transportation Systems
LAN Local Area Network
LBT Listen-Before-Talk
LEE Laptop Embedded Equipment
LME Laptop Mounted Equipment
LTE Long Term Evolution
M2M Machine-to-Machine
MAN Metropolitan Area Network
MCE Multi-cell/multicast Coordination Entity
MSR Multi-standard Radio
NAS Non-Access Stratum
OoC Out-of-coverage
PDCCH Physical Downlink Control Channel
PDSCH Physical Downlink Shared Channel
ProSe Proximity-based Services
PSTN Public Switched Telephone Network
PUSCH Physical Uplink Shared Channel
PUCCH Physical Uplink Control Channel
RB Resource Block
RNC Radio Network Controller
RRC Radio Resource Control
RRH Remote Radio Head
RRU Remote Radio Unit
TD-LTE Time division-LTE (i.e., TDD-LTE)
TDD Time Division Duplex
UE User Equipment
UL Uplink
V2I Vehicle-to-Infrastructure
V2N Vehicle-to-network
V2P Vehicle-to-Pedestrian
V2V Vehicle-to-vehicle
V2x Vehicle-to-anything-you-can-imagine
WAN Wide Area Network

The invention claimed is:

1. A method in a node, comprising:
determining a latency for an associated vehicle-to-anything (V2X) data packet;
generating a tag for the associated V2X data packet at a first layer, the generated tag indicating one or more parameters related to transmission of the associated data packet, wherein at least one of the one or more parameters comprises a ProSe Per-Packet Priority (PPP) value that is based at least on the latency for the associated data packet;
signaling the tag from the first layer to another layer;
mapping, at the another layer, the associated V2X data packet to a logical channel based on the one or more parameters including the PPP value indicated by the tag as well as a traffic type associated with the V2X data packet; and selecting one or more resources for transmission of the associated data packet based on the mapping of the associated data packet to the logical channel.

2. The method of claim 1, wherein the first layer is an application layer.

3. The method of claim 1, wherein the one or more parameters comprise one or more of:
a traffic type of the associated data packet;
a periodicity of the associated data packet;
a latency requirement of the associated data packet;
a priority of the associated data packet;
a type of device of the node;
a presence of an external power source for the node; and
a battery status of the node.

4. The method of claim 3, wherein the traffic type of the associated data packet is indicated by a destination group.

5. The method of claim 3, wherein the periodicity of the associated data packet is indicated by the priority of the associated data packet.

6. The method of claim 1, further comprising selecting, based on the tag, one or more of:
a power level for transmission of the associated data packet; and
a transmission format for transmission of the associated data packet.

7. The method of claim 1, comprising obtaining a mapping for use in mapping the associated data packet to the logical channel based on the one or more parameters indicated by the tag.

8. The method of claim 7, wherein obtaining the mapping for use in mapping the associated data packet to the logical channel based on the one or more parameters indicated by the tag comprises:
determining, by the node, the mapping for use in mapping the associated data packet to the logical channel based on the one or more parameters indicated by the tag.

9. The method of claim 7, wherein obtaining the mapping for use in mapping the associated data packet to the logical channel based on the one or more parameters indicated by the tag comprises:
receiving a mapping for use in mapping the associated data packet to the logical channel based on the tag.

10. The method of claim 1, wherein mapping the associated data packet to a logical channel based on the one or more parameters indicated by the tag comprises mapping the tag to a dedicated radio bearer.

11. The method of claim 10, wherein the mapping comprises a one-to-one mapping.

12. The method of claim 10, wherein a plurality of tags can be mapped to a single dedicated radio bearer.

13. The method of claim 1, comprising transmitting the associated data packet using the one or more resources selected for transmission of the associated data packet.

14. The method of claim 1, comprising transmitting the tag to one or more other nodes before the associated data packet is transmitted.

15. The method of claim 1, wherein:
the node is a first node;
the tag is a first tag;
the associated data packet is a first associated data packet; and
the method comprises receiving, from a second node, a second tag for a second associated data packet before receiving the second associated data packet.

16. The method of claim 1, wherein the tag is signaled from the first layer to the another layer as a bitmap.

17. The method of claim 1, wherein the node comprises one of:
a wireless device; and
a network node.

18. A node, comprising:
one or more processors, the one or more processors configured to:
determine a latency for an associated vehicle-to-anything (V2X) data packet;
generate a tag for the associated V2X data packet at a first layer, the generated tag indicating one or more parameters related to transmission of the associated data packet, wherein at least one of the one or more parameters comprises a ProSe Per-Packet Priority (PPP) value that is based at least on the latency for the associated data packet
generate a tag for an associated vehicle-to-anything (V2X) data packet at a first layer, the generated tag indicating one or more parameters related to transmission of the associated data packet, wherein at least one of the one or more parameters comprises a ProSe Per-Packet Priority (PPP) value;
signal the tag from the first layer to another layer;
map, at the another layer, the associated V2X data packet to a logical channel based on the one or more parameters including the PPP value indicated by the tag as well as a traffic type associated with the V2X data packet; and
select one or more resources for transmission of the associated data packet based on the mapping of the associated data packet to the logical channel.

19. The node of claim 18, wherein the first layer is an application layer.

20. The node of claim 18, wherein the one or more parameters comprise one or more of:
a traffic type of the associated data packet;
a periodicity of the associated data packet;
a latency requirement of the associated data packet;
a priority of the associated data packet;
a type of device of the node;
a presence of an external power source for the node; and
a battery status of the node.

21. The node of claim 20, wherein the traffic type of the associated data packet is indicated by a destination group.

22. The node of claim 20, wherein the periodicity of the associated data packet is indicated by the priority of the associated data packet.

23. The node of claim 18, wherein the one or more processors are configured to select, based on the tag, one or more of:
a power level for transmission of the associated data packet; and
a transmission format for transmission of the associated data packet.

24. The node of claim 18, wherein the one or more processors are configured to obtain a mapping for use in mapping the associated data packet to the logical channel based on the one or more parameters indicated by the tag.

25. The node of claim 24, wherein the one or more processors configured to obtain the mapping for use in mapping the associated data packet to the logical channel based on the one or more parameters indicated by the tag comprise one or more processors configured to:
determine, by the node, the mapping for use in mapping the associated data packet to the logical channel based on the one or more parameters indicated by the tag.

26. The node of claim 24, wherein the one or more processors configured to obtain the mapping for use in mapping the associated data packet to the logical channel based on the one or more parameters indicated by the tag comprise one or more processors configured to:

receive a mapping for use in mapping the associated data packet to the logical channel based on the tag.

27. The node of claim 18, wherein the one or more processors configured to map the associated data packet to a logical channel based on the one or more parameters indicated by the tag comprise one or more processors configured to map the tag to a dedicated radio bearer.

28. The node of claim 27, wherein the mapping comprises a one-to-one mapping.

29. The node of claim 27, wherein a plurality of tags can be mapped to a single dedicated radio bearer.

30. The node of claim 18, wherein the one or more processors are configured to transmit the associated data packet using the one or more resources selected for transmission of the associated data packet.

31. The node of claim 18, wherein the one or more processors are configured to transmit the tag to one or more other nodes before the associated data packet is transmitted.

32. The node of claim 18, wherein:
the node is a first node;
the tag is a first tag;
the associated data packet is a first associated data packet; and
the one or more processors are configured to receive, from a second node, a second tag for a second associated data packet before receiving the second associated data packet.

33. The node of claim 18, wherein the one or more processors are configured to signal the tag from the first layer to the another layer as a bitmap.

34. The node of claim 18, wherein the node comprises one of:
a wireless device; and
a network node.

* * * * *